United States Patent
Lovell

(10) Patent No.: US 9,443,186 B2
(45) Date of Patent: Sep. 13, 2016

(54) METHOD AND APPARATUS FOR MOUNTING RFID DEVICES TO PROCESS CONTROL DEVICES

(71) Applicant: Fisher Controls International LLC, Marshalltown, IA (US)

(72) Inventor: Michel Ken Lovell, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 25 days.

(21) Appl. No.: 14/299,709

(22) Filed: Jun. 9, 2014

(65) Prior Publication Data

US 2014/0361087 A1    Dec. 11, 2014

Related U.S. Application Data

(60) Provisional application No. 61/832,524, filed on Jun. 7, 2013, provisional application No. 61/951,187, filed on Mar. 11, 2014, provisional application No. 61/977,398, filed on Apr. 9, 2014.

(51) Int. Cl.
*G08B 13/14* (2006.01)
*G06K 19/077* (2006.01)
*G05B 15/02* (2006.01)

(52) U.S. Cl.
CPC ......... *G06K 19/07758* (2013.01); *G05B 15/02* (2013.01); *Y10T 29/49018* (2015.01)

(58) Field of Classification Search
USPC .................... 235/451, 492; 340/572.7, 572.8
See application file for complete search history.

(56) References Cited

U.S. PATENT DOCUMENTS

| | | | |
|---|---|---|---|
| 5,757,528 A * | 5/1998 | Bradley | H04B 10/40 398/129 |
| 6,342,870 B1 * | 1/2002 | Mehrkens | H01Q 1/1228 343/890 |
| 7,036,734 B2 * | 5/2006 | Baker | G06K 7/10316 235/451 |
| 7,058,542 B2 | 6/2006 | Hauhia et al. | |
| 8,212,655 B2 | 7/2012 | Nelson et al. | |

(Continued)

FOREIGN PATENT DOCUMENTS

| | | |
|---|---|---|
| DE | 102011081517 | 2/2013 |
| DE | 102012214693 | 2/2013 |

(Continued)

OTHER PUBLICATIONS

Danilo De Donno et al., "Enabling Self-Powered Autonomous Wireless Sensors with New-Generations I2C-RFID Chips," 2013 IEEE MTT-S International Microwave Symposium Digest (MTT), Seattle, WA, Jun. 2013, 4 pages.

(Continued)

*Primary Examiner* — Daniel Hess
(74) *Attorney, Agent, or Firm* — Hanley, Flight & Zimmerman, LLC

(57) ABSTRACT

Method and apparatus for mounting RFID devices to process control devices are disclosed. An example apparatus includes a mount to couple a radio-frequency identification tag to a field device. The mount is rotatable relative to the field device to adjust the radio-frequency identification tag to be oriented relative to a radio-frequency identification reader. The mount includes a first portion to be coupled to the field device and a second portion to receive the radio-frequency identification tag.

19 Claims, 8 Drawing Sheets

(56) References Cited

U.S. PATENT DOCUMENTS

| | | | |
|---|---|---|---|
| 2002/0105478 A1* | 8/2002 | Overton | H01Q 1/088 343/892 |
| 2006/0200256 A1 | 9/2006 | Mason et al. | |
| 2007/0021140 A1 | 1/2007 | Keyes, IV et al. | |
| 2007/0080810 A1* | 4/2007 | Juds | G08B 13/24 340/572.8 |
| 2007/0114280 A1 | 5/2007 | Coop et al. | |
| 2007/0252701 A1* | 11/2007 | Berry | G06K 7/10336 340/572.7 |
| 2009/0078762 A1* | 3/2009 | Forster | A01K 11/001 235/385 |
| 2009/0167503 A1* | 7/2009 | Cook | G01L 9/0025 340/10.41 |
| 2009/0303898 A1 | 12/2009 | Isenmann et al. | |
| 2010/0302008 A1 | 12/2010 | Engelstad et al. | |
| 2011/0266353 A1* | 11/2011 | Binmore | G06K 19/07728 235/492 |
| 2012/0286122 A1* | 11/2012 | Tankielun | G01R 29/0864 248/346.06 |
| 2013/0141888 A1 | 6/2013 | Wittmer et al. | |
| 2013/0186951 A1* | 7/2013 | Zhu | G06K 19/07779 235/375 |
| 2013/0190897 A1 | 7/2013 | Junk et al. | |
| 2014/0167964 A1* | 6/2014 | Teeter | G09F 3/0317 340/572.3 |
| 2014/0364963 A1 | 12/2014 | Lovell et al. | |

FOREIGN PATENT DOCUMENTS

| | | |
|---|---|---|
| DE | 102011084789 | 4/2013 |
| EP | 1832943 | 9/2007 |

OTHER PUBLICATIONS

AMS AG, "RFID with Senses," retrieved from the Internet, www.ams.com/SL13A, Feb. 2013, 2 pages.

AMS AG, "RFID with Senses," retrieved from the Internet, www.ams.com/SL900A, Feb. 2013, 2 pages.

Claire Swedberg, "BP Uses RFID Sensors to Track Pipe Corrosion," retrieved from the Internet, http://www.rfidjournal.com/articles/view?8181, Jan. 31, 2011, 2 pages.

Impinj, "Introducing Monza X Chips," retrieved from the Internet, www.impinj.com, 2012, 2 pages.

IDS Microchip AG, "SL900A Single-Chip EPC Data Logger with Sensor," retrieved from the Internet, www.ids-microship.com, Mar. 2010, 2 pages.

William Frick & Company, "Solar Powered RFID Tag (Off-Metal)," retrieved from the Internet, www.fricknet.com, 4 pages.

TEGO, "TegoChip Dual Memory (DM)," retrieved from the Internet, www.tegoinc.com, 2013, 2 pages.

Intelleflex Corporation, "Intelleflex TMT-8500 Temperature Monitoring Tag," retrieved from the Internet, www.intelleflex.com, 2010, 2 pages.

Intelleflex Corporation, "Intelleflex SMT-8100 Special Purpose RFID Tag for Metals & Liquids," retrieved from the Internet, www.intelleflex.com, 2012, 2 pages.

International Searching Authority, "International Search Report," issued in connection with International Patent Application No. PCT/US2014/041265, dated Sep. 17, 2014 (3 pages).

International Searching Authority, "Written Opinion," issued in connection with International Patent Application No. PCT/US2014/041265, dated Sep. 17, 2014 (8 pages).

* cited by examiner

METHOD AND APPARATUS FOR MOUNTING RFID DEVICES TO PROCESS CONTROL DEVICES

CROSS-REFERENCE TO RELATED APPLICATIONS

This patent claims the benefit of the filing date of U.S. Provisional Application Ser. No. 61/832,524 filed on Jun. 7, 2013, U.S. Provisional Application Ser. No. 61/951,187 filed on Mar. 11, 2014, and U.S. Provisional Application Ser. No. 61/977,398 filed on Apr. 9, 2014, all of which are hereby incorporated by reference in their entireties.

FIELD OF THE DISCLOSURE

This patent relates generally to RFID devices and, more particularly, to method and apparatus for mounting RFID devices to process control devices.

BACKGROUND

Process control systems, like those used in chemical, petroleum or other processes, typically include one or more process controllers operatively coupled to one or more field devices via analog, digital or combined analog/digital buses. The field devices, which may be, for example, instruments, valve positioners, switches and transmitters (e.g., temperature, pressure and flow rate sensors), perform process control functions within the process such as opening or closing valves and measuring process control parameters. The process controllers receive signals indicative of process measurements made by the field devices and then process this information to generate control signals to implement control routines, to make other process control decisions, and to initiate process control system alarms.

Information from the field devices and/or the controller is usually made available over a data highway or communication network to one or more other devices or systems, such as operator work stations, personal computers, data historians, report generators, centralized databases, etc. Such devices or systems are typically located in control rooms and/or other locations remotely situated relative to the harsher plant environment. These devices or systems, for example, run applications that enable an operator to perform any of a variety of functions with respect to the process implemented by a process control system, such as viewing the current state of a process, changing an operating state, changing settings of a process control routine, modifying the operation of the process controllers and/or the field devices, viewing alarms generated by field devices and/or process controllers, simulating the operation of the process for the purpose of training personnel and/or evaluating the process, etc.

SUMMARY

In one example, an apparatus includes a mount to couple a radio-frequency identification tag to a field device. The mount is rotatable relative to the field device to adjust the radio-frequency identification tag to be oriented relative to a radio-frequency identification reader. The mount includes a first portion to be coupled to the field device and a second portion to receive the radio-frequency identification tag.

In another example, an apparatus includes a radio-frequency identification tag and an adapter having a first portion and a second portion opposite the first portion. The radio-frequency identification tag is coupled to the second portion. The first portion is to be received by the field device. The first portion is to enable the adapter to be rotated relative to the field device to adjust an orientation of the radio-frequency identification tag relative to a radio-frequency identification reader.

In another example, a method includes coupling an adapter to a field device installed at a field location. The adapter has a radio-frequency identification tag. The example method also includes orientating the radio-frequency identification tag of the adapter relative to a radio-frequency identification reader that is to detect the radio-frequency identification tag.

Figure 1:
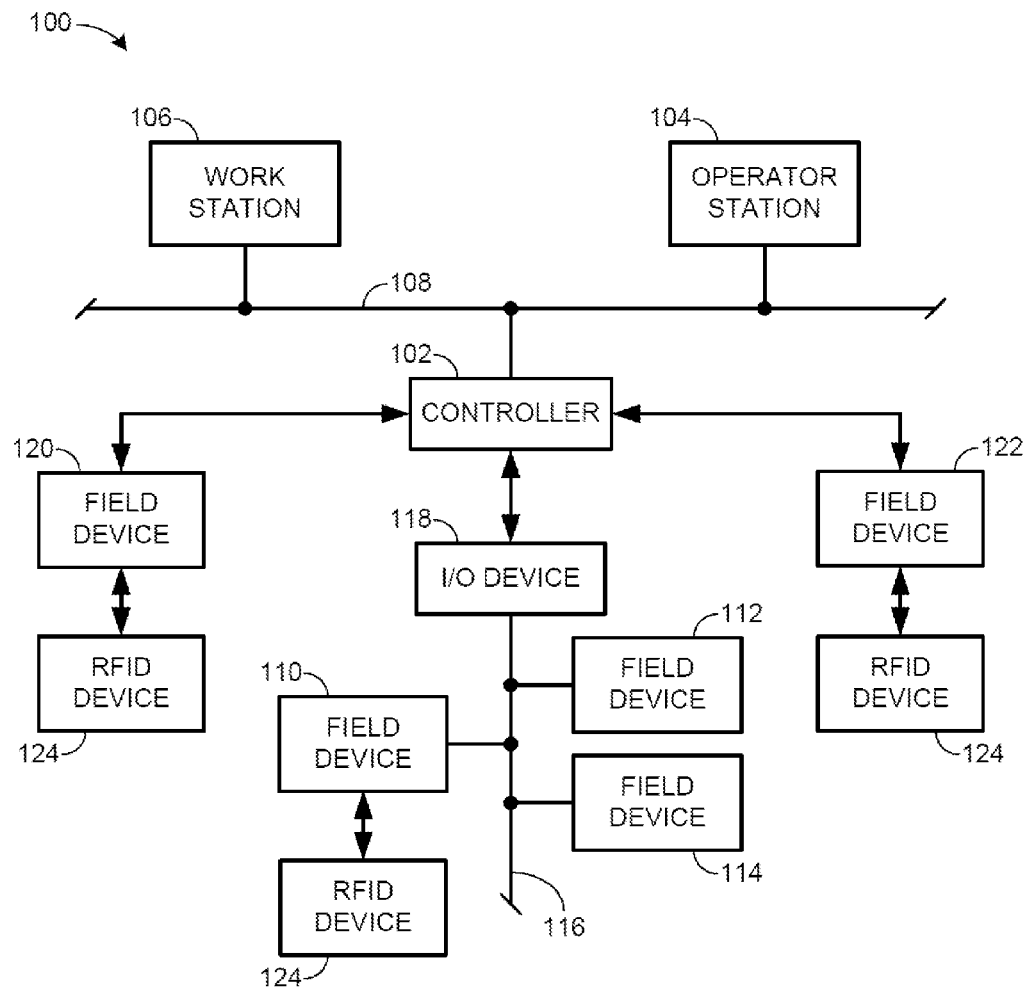
FIG. 1 is a schematic illustration of an example process control system within which the teachings of this disclosure may be implemented.

The figures are not to scale. Instead, to clarify multiple layers and regions, the thicknesses of the layers may be enlarged in the drawings. Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

While field devices located throughout a process control system may be monitored, along with their corresponding parameters, from a central, remotely located control room, there are circumstances where operators, engineers, and/or other plant personnel are located in the field near the field devices such as, for example, during the inspection, maintenance and/or repair of field devices and/or other control elements within a process plant. Frequently, maintenance and repair is a planned and time-sensitive plant activity dependent upon swift access to detailed plant information. When field devices and/or final control elements fail, the inability to access technical information necessary to complete the repairs while plant personnel are located in the field near such components can result in costly waste and lost production. More reliable equipment and predictive maintenance via prognostic algorithms are goals in current maintenance concepts that require access to robust maintenance and repair information.

Maintenance programs are often plagued with records and parts ordering systems that contain misfiled, out-of-date, incomplete and/or inaccurate records. Further, without an integrated enterprise solution, data can be located in multiple physical locations and/or stored in electronic data records that are not quickly accessible by maintenance personnel during a walk-down. As part of a typical walk-down, every piece of equipment is examined, and nameplate specifications, such as model and serial numbers, are recorded. A detailed set of attributes for each type of equipment also is collected.

Additionally, in maintenance situations where local replacement of a field device is required, device configuration and commissioning can become a significant issue. Specifically, field devices that include embedded microprocessors and/or microcontrollers may have complex or complicated configurations that require maintenance technicians to reference technical data stored remotely throughout the enterprise solution. In many such situations, technicians may rely on written records that may not be fully up to date and/or may be otherwise incomplete. Further, in circumstances where technicians connect to the enterprise solution to retrieve the needed technical data, access to the data can be slow (e.g., based on the communication protocols implemented throughout the enterprise to convey data). Accordingly, in such situations, among other situations where plant personnel are local to the field devices, it is desirable to enable the plant personnel to communicate with the field devices that are able to store relevant technical data locally to provide complete and up to date information without depending upon slow communication speeds to retrieve the same information stored at a remote site.

In some instances, plant personnel carry portable handheld communicators via which they may communicate with and/or interrogate a device of interest. However, in many such instances, physically connecting a portable communicator device to a field device requires the plant personnel to, for example, unscrew and remove a terminal cap of the field device. As a result, access is typically limited to field devices that are out of service because removing a terminal cap from a currently operating field device (i.e. a field device in service) would violate plant safety standards. To overcome this obstacle, intrinsically safe wireless transceivers have been implemented to communicate with field devices and then wirelessly transmit the data elsewhere, including a handheld wireless receiver carried by nearby plant personnel.

Although wireless transceivers are an improvement, currently known wireless transceivers suffer from several limitations. For example, many known wireless transceivers rely on loop power provided to the corresponding field device to charge batteries and/or capacitors to power wireless transmissions. As many field devices are implemented on a tight power budget as a result of the low voltage signal provided by the loop power, wireless communications by many known wireless transceivers are limited to periods of time where sufficient power is available and/or after a period of time where sufficient power has been scavenged from the loop power. As such, many known wireless transceivers are not conducive to high speed communications and/or transfers of significant amounts of data. Additionally, many known wireless transceivers are in serial communication with a wired modem associated with the particular communication protocol implementing the interaction of field devices within the process control system. As a result, the communication speed of the wireless transceivers is limited to the communication speed of the corresponding protocol, which can be relatively slow (e.g., the well-known HART protocol is limited to 1200 baud). Further, because known wireless transceivers typically rely on loop power to function, wireless transmissions are only possible when the process plant is running and the particular field device is not otherwise unpowered (e.g., not placed out of service due to maintenance).

The above obstacles are overcome and high speed local communications with a field device, among various other advantages, are realized through the implementation of the teachings disclosed herein and developed more fully below. In particular, the teachings disclosed herein achieve wireless communications through the use of radio-frequency identification (RFID), which is an extremely energy efficient technology. For example, ultra-high frequency (UHF) passive tags receive power from an electromagnetic field (EMF) generated from a nearby handheld reader (e.g., typically within a range of approximately 30 feet). Semi-passive tags use local power (e.g., a battery) to power internal circuits, but still rely on power from a handheld reader for communication to the reader. With the reliance on local power for communications and proper polarization of the antenna, semi-passive tags can provide greater read ranges than passive tags. Active tags use local power to power both internal circuits and to communicate with a reader.

In some disclosed examples, a passive and/or semi-passive tag is physically and operatively coupled to a field device within a process control system. In such examples, the tag may draw power (e.g., a semi-passive configuration) from loop power (provided by the control system to operate the field device) to communicate with the field device and/or gather data from the field device. Once data from the field device is gathered, in some examples, the tag may transmit the data to a nearby handheld reader using power received from an EMF of the reader. As such, plant personnel local to the field device can wirelessly communicate with the field device in a manner that maintains plant safety policy (e.g., no need to unscrew and remove a terminal cap). Additionally, such communications can be accomplished when the field device is active or running and/or when the device is out of service or otherwise without power (e.g., a passive configuration). In some examples, a small amount of power can be harvested from the loop power supplied to the field device to implement a semi-passive tag design to improve communication range relative to a passive tag design.

Furthermore, while RFID tags typically have limited onboard memory, in some examples, as data is gathered from the field device, the data is stored in a separate non-volatile memory that is accessible by the RFID tag when needed based on a request via a portable RFID reader/writer. By gathering and storing the data in this manner, the data is effectively cached for quick retrieval without the limitation of slow communications based on the power consumption requirements of other known wireless transceivers and/or based on the requirements of the communication protocol implemented over the process control system. Further, the separate non-volatile memory provides extra memory for a corresponding field device, which may be used to store additional information related to the identification, maintenance, and/or commissioning of the field device to assist in maintaining and/or repairing faulty devices. In some examples, communications from a central control room may also be written to the non-volatile memory for retrieval by plant personnel during a walk-down and/or at any other time. Additionally, in some examples disclosed herein, the RFID tags are associated with a modem to communicate with the field device, and/or the central control room according to the particular communications protocol implemented in the control system (e.g., HART). Further, in some examples, a portable RFID reader/writer can be used to update and/or provide additional information to the non-volatile memory for subsequent reference and access. Additionally, in some examples the writing of data to the non-volatile memory and the corresponding access of the data is implemented using asymmetric cryptography to certify and/or authenticate the validity of the data.

FIG. 1 is a schematic illustration of an example process control system 100 within which the teachings of this disclosure may be implemented. The example process control system 100 of FIG. 1 includes one or more process controllers (one of which is designated at reference numeral 102), one or more operator stations (one of which is designated at reference numeral 104), and one or more work stations (one of which is designated at reference numeral 106). The example process controller 102, the example operator station 104 and the example work station 106 are operatively coupled via a bus and/or local area network (LAN) 108, which is commonly referred to as an application control network (ACN).

The example operator station 104 of FIG. 1 allows an operator, engineer, and/or other plant personnel to review and/or operate one or more operator display screens and/or applications that enable the plant personnel to view process control system variables, states, conditions, alarms; change process control system settings (e.g., set points, operating states, clear alarms, silence alarms, etc.); configure and/or calibrate devices within the process control system 100; perform diagnostics of devices within the process control system 100; and/or otherwise interact with devices within the process control system 100.

The example work station 106 of FIG. 1 may be configured as an application station to perform one or more information technology applications, user-interactive applications and/or communication applications. For example, the work station 106 may be configured to perform primarily process control-related applications, while another work station (not shown) may be configured to perform primarily communication applications that enable the process control system 100 to communicate with other devices or systems using any desired communication media (e.g., wireless, hardwired, etc.) and protocols (e.g., HTTP, SOAP, etc.). The example operator station 104 and the example work station 106 of FIG. 1 may be implemented using one or more work stations and/or any other suitable computer systems and/or processing systems. For example, the operator station 104 and/or work station 106 could be implemented using single processor personal computers, single or multi-processor work stations, etc.

The example LAN 108 of FIG. 1 may be implemented using any desired communication medium and protocol. For example, the example LAN 108 may be based on a hardwired and/or wireless Ethernet communication scheme. However, any other suitable communication medium(s) and/or protocol(s) could be used. Further, although a single LAN 108 is illustrated in FIG. 1, more than one LAN and/or other alternative pieces of communication hardware may be used to provide redundant communication paths between the example systems of FIG. 1.

The example controller 102 of FIG. 1 may be, for example, a DeltaV™ controller sold by Fisher-Rosemount Systems, Inc., an Emerson Process Management company. However, any other controller could be used instead. Further, while only one controller 102 is shown in FIG. 1, additional controllers and/or process control platforms of any desired type and/or combination of types could be coupled to the LAN 108. In any case, the example controller 102 performs one or more process control routines associated with the process control system 100 that have been generated by a system engineer and/or other plant personnel using the operator station 104 and which have been downloaded to and/or instantiated in the controller 102.

As shown in the illustrated example of FIG. 1, the example controller 102 may be coupled to a plurality of smart field devices 110, 112, 114 via a data bus 116 and an input/output (I/O) gateway 118. The smart field devices 110, 112, 114 may be Fieldbus compliant instruments, transmitters, sensors, etc., in which case the smart field devices 110, 112, 114 communicate via the data bus 116 using the well-known Foundation Fieldbus protocol. Of course, other types of smart field devices and communication protocols could be used instead. For example, the smart field devices 110, 112, 114 could instead be Profibus and/or HART compliant devices that communicate via the data bus 116 using the well-known Profibus and HART communication protocols. Additional I/O devices (similar and/or identical to the I/O gateway 118) may be coupled to the controller 102 to enable additional groups of smart field devices, which may be Foundation Fieldbus devices, HART devices, etc., to communicate with the controller 102.

In addition to the example smart field devices 110, 112, 114 coupled via the I/O gateway 118, one or more non-smart field devices 120 and/or one or more smart field devices 122 may be operatively coupled to the example controller 102. The example smart field device 122 and non-smart field device 120 of FIG. 1 may be, for example, conventional 4-20 milliamp (mA) or 0-24 volts direct current (VDC) devices that communicate with the controller 102 via respective hardwired links. In such examples, the hardwired links enable the field device 120 to communicate with the controller 102 and provide electrical power to the field device 120 (e.g., loop power).

Additionally, each of the field devices 110, 120, 122 is shown in the illustrated example of FIG. 1 coupled to a corresponding RFID device 124. With respect to the smart field devices 110, 122 in the illustrated example, the corresponding RFID devices 124 convert outbound data obtained from the field devices 110, 122 (e.g., parameter values, diagnostic information, etc.) according to a particular communication protocol associated with the field devices 110, 122 (e.g., HART, Profibus, Foundation Fieldbus, etc.) for transmission to an RFID reader/writer (e.g., an RFID reader/writer 206 of FIG. 2). Additionally, in some examples, the RFID devices 124 may convert (e.g., via the modem) inbound data obtained from the RFID reader/writer to be transmitted to the field devices 110, 122 and/or other components of the process control system 100 according to the particular communications protocol. In addition to storing and/or communicating process control data, in some examples, the RFID devices 124 store other information (e.g., maintenance records, parts lists, serial card information, etc.) associated with the corresponding smart field device 110, 122 or non-smart field device 120 as described in further detail below. In some examples, such information is also communicated to the RFID devices 124 via the corresponding field devices. Additionally or alternatively, in some examples, such data is communicated via the RFID reader/writer. Accordingly, the RFID devices 124 enable plant personnel to communicate locally and wirelessly with the field devices 110, 120, 122 without power consumption requirements that may decrease the power efficiency of the process control system (e.g., by drawing on the loop power) and/or increase maintenance costs (e.g., by requiring the acquisition and/or replacement of batteries).

An example RFID device 124 constructed in accordance with the teachings described herein is shown and described below in connection with FIG. 2. It should be appreciated that a single RFID device 124 may be used to interact with more than one of the field devices 110, 112, 114, 120, 122 by moving the RFID device 124 from one device to another as dictated by the circumstances of the process system and the particular needs of plant personnel. Additionally or alternatively, as shown in FIG. 1, multiple RFID devices 124 may be connected to any or all of the field devices 110, 112, 114, 120, 122. More particularly, in some examples, each field device 110, 112, 114, 120, 122 (or at least some of the field devices) is coupled to a separate RFID device 124 and remains coupled to the corresponding RFID device 124 throughout an entire lifecycle, or portion thereof, of the field device. In some such examples, the RFID device 124 contains a non-volatile memory (e.g., a non-volatile memory 208 of FIG. 2) separate from any memory internal to the corresponding field device. In such examples, the RFID device 124 is capable of storing serial card data and/or any other data associated with the identification, maintenance, configuration, and/or operation of the field device. Typically, the memory within a field device is relatively limited such that much of this information (e.g., documentation and historical records of maintenance, repairs, parts replacements, etc.) has been stored remotely at a central maintenance database for the entire enterprise. However, by coupling the RFID device 124 with its own non-volatile memory in accordance with the teachings disclosed herein, this information can be accessed quickly and easily by plant personnel local to the field device (e.g., during a walk-down) with an RFID reader/writer. Furthermore, in such examples, the information associated with the field device stored on the RFID device 124 is accessible even when the field device is taken out of service and/or removed from the plant environment (e.g., when shipped off for repairs). Additionally, as described in greater detail below, in some examples, at least some of the information may be stored in an onboard memory of an RFID tag (an RFID tag 210 of FIG. 2) within the RFID device 124 such that the information can be accessed without a power source to the field device.

While FIG. 1 illustrates an example process control system 100 within which the methods and apparatus to communicate with process control system field devices using an RFID device described in greater detail below may be advantageously employed, the methods and apparatus described herein may, if desired, be advantageously employed in other process plants and/or process control systems of greater or less complexity (e.g., having more than one controller, across more than one geographic location, etc.) than the illustrated example of FIG. 1.

Figure 2:
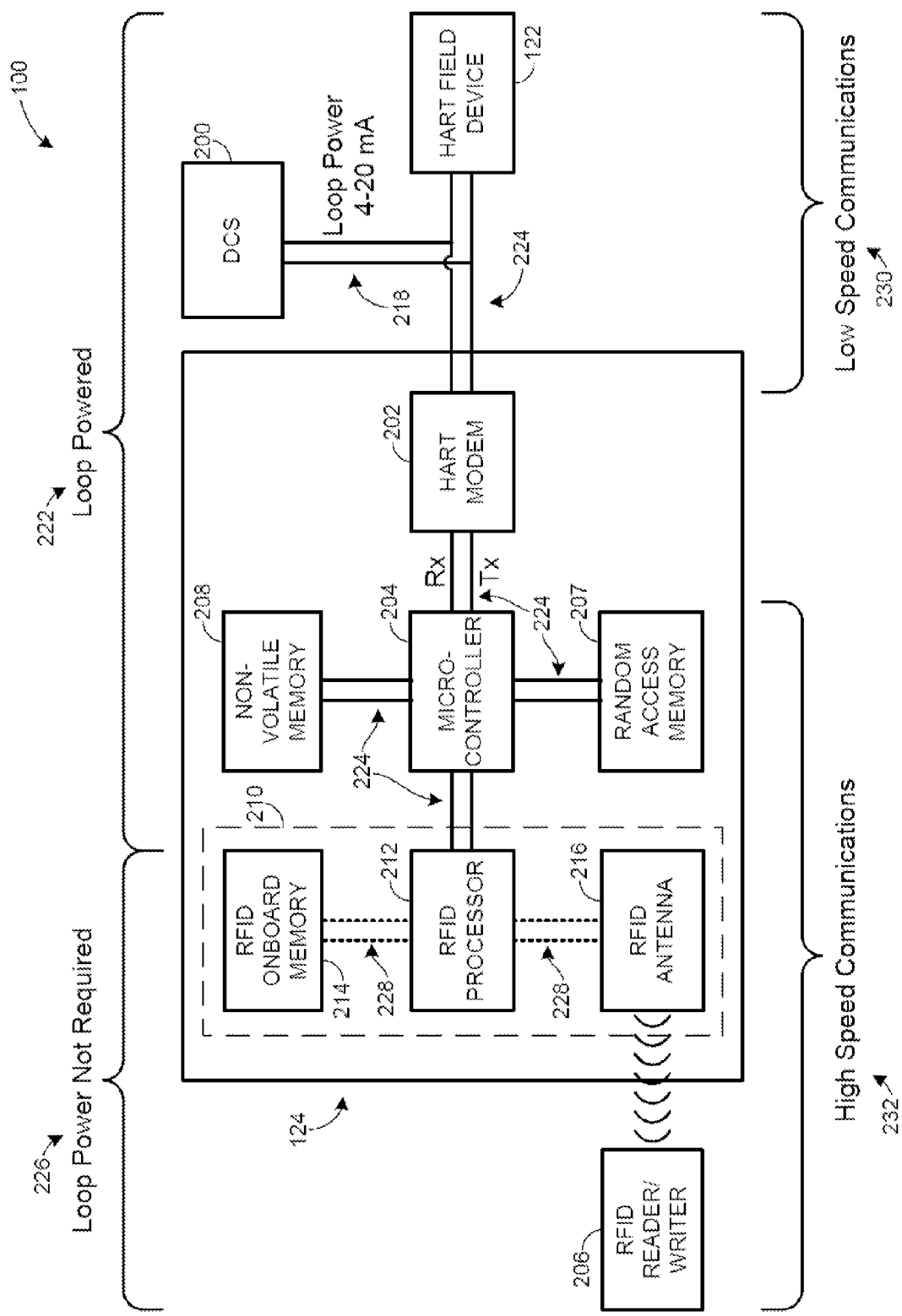
FIG. 2 illustrates an example manner of implementing the example RFID device of FIG. 1.

FIG. 2 illustrates an example manner of implementing the example RFID device 124 of FIG. 1 connected to the field device 122 of the process control system 100 of FIG. 1 (the remainder of which is represented by the distributed control system (DCS) block 200). In the illustrated example, the RFID device 124 includes a HART modem 202, a microcontroller 204 associated with a random access memory RAM 207 and a non-volatile memory 208. The RFID device 124 also includes an RFID tag 210 that comprises a main RFID processor 212, an RFID onboard memory 214 (also a form of non-volatile memory), and an RFID antenna 216. In some examples, the RFID processor 212, the RFID onboard memory 214, and the RFID antenna 216 are all incorporated onto a single integrated circuit (IC).

In the illustrated example of FIG. 2, the field device 122 is identified as a HART-compliant field device. As stated above, the teachings of this disclosure may be implemented in connection with a field device associated with any suitable communication protocol. However, the following disclosure is explained by way of example in terms of the HART communication protocol. Thus, as shown in FIG. 2, the HART field device 122 is operatively coupled to the DCS 200 via a 2-wire connection 218 (represented by the two solid lines) to communicate according to the HART protocol. In addition to transmitting and receiving control signals over the 2-wire connection 218, the field device 122 also draws its power from the 2-wire connection 218 (e.g., the field device 122 is loop powered). Additionally, in the illustrated example, the RFID device 124 is linked to the 2-wire connection 218 such that the HART field device 122 is operatively coupled to the RFID device 124 via the HART modem 202 and to enable the RFID device 124 to draw power from the 4-20 mA loop power provided via the 2-wire connection 218.

The example HART modem 202 is configured to transmit information from the HART field device 122 according to the HART protocol (or any other suitable communication protocol) to the microcontroller 204 according to a serial communication protocol (e.g., universal serial bus (USB), Ethernet, synchronous serial (e.g., serial peripheral interface (SPI) bus), etc.). Additionally, the example HART modem 202 is configured to transmit information from the microcontroller 204 according to the serial communication protocol to the HART field device 122 according to the HART protocol.

The example microcontroller 204 controls the timing and/or scheduling of data sent to and/or from the field device 122 and/or the RFID tag 210. In some examples, the data includes requests to poll information (e.g., process variable values, alarms, etc.) from the field device 122. In other examples, the data includes commands instructing the field device 122 to implement certain functionality (e.g., tuning, calibration, diagnostics, commissioning, etc.). Data received by the microcontroller 204 of the illustrated example may be stored temporarily in the RAM 207 and/or long-term in the non-volatile memory 208. Additionally or alternatively, the data received by the microcontroller 204 may be sent to the RFID processor 212 for subsequent storage in the corresponding RFID onboard memory 214 and/or transmitted to an external RFID reader/writer 206 via the RFID antenna 216.

As identified by brace 230, communications between the field device 122, the HART modem 202 of the RFID device 124, and the DCS 200 are relatively slow or low speed because the communications are governed by the HART protocol, which is limited to about 1200 baud. In contrast, the communications between the other elements illustrated in FIG. 2, as identified by brace 232, are relatively high speed in that they are based on a high speed serial communication protocol (e.g., SPI bus), which may achieve approximately 115 kbps. Thus, by implementing the example RFID device 124 in accordance with the teachings disclosed herein, relatively slow HART based communications may be monitored over time and cached or stored in the non-volatile memory 208 and/or the RFID onboard memory 214 for subsequent access by plant personnel handling an RFID reader/writer (e.g., the RFID reader/writer 206 shown in FIG. 2) at a much faster rate via the serial bus communication protocol.

As identified by brace 222, the communications associated with the field device 122, the HART modem 202, the microcontroller 204, the non-volatile memory 208 and the random access memory 207 (represented in FIG. 2 by solid lines 224) require power from the DCS 200 via the 2-wire connection 218 (i.e. these devices are loop powered). In contrast, as identified by brace 226, the communications within the RFID tag 210 (represented by dotted lines 228) and the wireless communication between the RFID antenna 216 and the RFID reader/writer 206 do not require loop power. Rather, the RFID communications in the illustrated example (e.g., those identified by the dotted lines 228) draw power from the RFID reader/writer 206 via inductive or radiative coupling. Thus, not only can the RFID tag 210 function without loop power, the RFID tag 210 can function without a battery supply or charged capacitors (e.g., which may be charged based on available loop power) such that data stored in the RFID onboard memory 214 of the RFID tag 210 is accessible any time the RFID reader/writer 206 is within range of the antenna 216.

In some examples, the amount of data that can be stored onboard the RFID tag 210 (e.g., within the RFID onboard memory 214) is relatively limited. For example, many known RFID tags have an upper memory threshold of 32 kilobytes. However, with RFID technology there is a tradeoff between the amount of memory available and the range over which data stored in the memory can be accessed wirelessly via an RFID reader/writer. For example, using the 32 kilobytes of memory may limit the RFID communication range to around 2 feet, whereas smaller amounts of memory (e.g., 512 bits) can allow ranges exceeding 30 feet (the range may also depend upon the antenna design of the RFID tag). In some examples, a range of 2 feet may be acceptable. However, in other examples, where a field device is not readily accessible by plant personnel in the field (e.g., is placed up high, located behind other equipment, beyond safety boundaries, etc.), the RFID onboard memory 214 of the RFID tag 210 corresponding to such a field device may only contain 512 bits of data, which enables a range of approximately 30 feet. Accordingly, the terms "local," "near," "nearby," and related terms associated with the location or position of plant personnel and/or an RFID reader/writer relative to a field device are expressly defined as being within the maximum range of communication between the RFID reader/writer and an RFID device coupled to the corresponding field device.

While the memory of the RFID tag 210 (e.g., the RFID onboard memory 214) is relatively limited, the non-volatile memory 208 associated with the microcontroller 204, in some examples, can be much larger. In this manner, additional information related to the field device 122 can be stored that may otherwise be unavailable due to the limited memory space of the field device 122. For instance, in some examples, the non-volatile memory 208 stores maintenance and/or repair information gathered over the entire lifecycle of the field device 122 (or any portion thereof). Such information may include recommended parts lists, photos, model/serial number of the field device and/or associated parts, maintenance instructions and/or procedures, as well as a historical archive of the nature and timing of any device failures and resulting maintenance response (e.g., alarms, diagnostic test results, part replacements, etc.). In this manner, whenever maintenance technicians are examining the field device (e.g., during a routine walk-down or because of a device failure), they will have immediate and ready access to all relevant information to be able to assess the situation and/or implement appropriate next steps. Furthermore, in this manner, the same relevant information is even accessible if the device has been removed and relocated from the plant for the purposes of repair and/or more exhaustive diagnostic testing.

Further, as shown in the illustrated example, the communication between the microcontroller 204 and the RFID processor 212 requires loop power such that not everything that can be stored in the non-volatile memory 208 associated with the microcontroller 204 will be available to the RFID tag 210 when there is no power. Accordingly, in some examples, a subset of the data obtained from the field device 122 that is likely to be of the most benefit when there is no power is stored directly on the RFID tag 210 (e.g., in the RFID onboard memory 214) as is described more fully below. Even though it is unlikely that the RFID tag 210 can store all data gathered from the field device 122 because the amount of memory required exceeds the memory available in the RFID onboard memory 214, caching the data from the non-volatile memory 208 still provides the advantage of wirelessly accessing the data (via the RFID reader/writer 206) at communications speeds much higher than possible if the field device 122 were polled directly, which is subject to the slow communication speed of the HART protocol. However, in the illustrated example, loop power is used to enable the RFID tag 210 to communicate with the microcontroller 204 and access the non-volatile memory 208.

Implementing communications via RFID technology in accordance with the teachings disclosed herein has several advantages. First, RFID transmissions can occur whenever they are desired and plant personnel have an RFID reader/writer that is within a suitable range. That is, RFID communications between the RFID tag 210 and the RFID reader/writer 206 of the illustrated example are not dependent on the process control system 100 being in operation and powered up. In contrast, other known wireless radio transceivers used in process control systems (e.g., based on a ZigBee communication protocol) require a significant amount of power, which is often scavenged from available loop power provided to the corresponding field device over time until capacitors associated with the transceiver are sufficiently charged to power a signal transmission. Due to the tight power budget frequently associated with the low voltage power source provided to field devices, a delay of up to a minute may be needed to harvest sufficient power to transmit a HART command. Under such constraints, the types (and amounts) of wireless communications possible are significantly limited (e.g., to providing basic control information such as values for process variables, and/or other key parameters). For example, diagnosing and/or configuring a HART field device can involve well over 1000 HART commands. At approximately one HART command per minute, ZigBee based wireless transceivers are not practicable for such purposes. However, as RFID technology uses no other power than what is provided by an RFID reader/writer, data can be freely communicated whenever the RFID reader/writer is within range of the antenna of an RFID tag.

Another advantage of using the RFID tag 210 of the illustrated example to enable wireless communications is that such communications can be carried out even if the DCS 200 is shut down, the field device 122 is taken out of service, and/or power is otherwise cut off. Thus, not only can the RFID tag 210 communicate with the RFID reader/writer 206 when the field device 122 is without power, the same communications are still available even when the field device is taken offsite (e.g., when being shipped off for repairs) and/or before being installed and commissioned into a control system. Inasmuch as such communications are made without loop power, the corresponding data in such examples is stored onboard the RFID tag 210 (e.g., in the RFID onboard memory 214). In such examples, due to the memory constraints of the RFID tag 210, only the data that is most likely to be desired when there is no power is stored in the RFID tag 210 (any additional data gathered from the field device 122 may be stored in the non-volatile memory 208). In some examples, the data stored in the RFID tag 210 is associated with the identification (e.g., serial card data), maintenance, and/or commissioning and/or configuring of the field device 122. Storing such information on the RFID tag 210 is advantageous because the data can be used to improve the accuracy and speed with which the field device 122 may be repaired (many cases of which involve the field device being unpowered). For example, by storing the serial number of the field device 122 on the RFID tag 210 (which, in some examples, is physically attached to the field device even during shipping for repairs), the field device 122 can be identified during the shipping process (e.g., when it is crated on a truck) to reduce the potential of the field device 122 becoming lost and/or confused with another device.

Further, in some examples, the maintenance data associated with the field device 122 stored on the RFID onboard memory 214 of the RFID tag 210 may include the date of manufacture, a parts list (e.g., based on an engineering master (EM) string to reduce memory requirements), spare parts recommendations, images/photos of the field device 122 and/or corresponding parts, and/or maintenance records (e.g., the date of last maintenance and/or calibration, the date when the field device 122 was first installed, etc.). In accordance with the teachings disclosed herein, any or all of the above forms of maintenance data may be accessible before the field device 122 is coupled to a power supply to facilitate the ordering of parts and/or the speed at which issues may be assessed and ultimately repaired.

Additionally, in some examples, the RFID tag 210 may store the particular asset tag for the field device 122 and/or other data related to commissioning and/or configuring the field device 122. Generally, when a field device is commissioned or configured, a field technician executes a series of tests to verify the functionality of the field device and subsequently configures and calibrates the field device by storing operational settings in the field device for installation into the process plant. In some examples, such operational settings to configure and calibrate the field device are stored within the RFID onboard memory 214 of the RFID tag 210. In such examples, should the field device fail or otherwise need replacing, plant personnel can quickly retrieve the operational settings from the failed device (via the RFID reader/writer 206) and load them onto another RFID tag 210 corresponding to a replacement field device. In other examples, the RFID device 124 may be taken from the removed field device and coupled to the replacement field device to provide the stored operational settings directly to the new replacement device. By implementing either of the above examples, the time efficiency to replace field devices may be significantly improved. That is, the manual process of validating and/or populating variables and other parameters to commission and configure the field device 122 can be automated to significantly reduce labor costs and improve accuracy. Furthermore, in some examples, a field device (e.g., the field device 122) may be temporarily replaced or removed from service while it is repaired before being re-installed within the process system. In some such examples, if any data associated with the field device 122 changes after being repaired, the memory in the RFID tag 210 may be updated (while the field device 122 is powered) such that the new information is accessible (via the RFID reader/writer 206) before the field device 122 is re-installed and re-commissioned in the process control system 100.

Further, the communication speed of wireless transmissions using the RFID tag 210 is much faster than known wireless transceivers in a process control system. For example, in a wireless HART context, known transceivers are typically configured in serial communication with a wired HART modem such that the transceiver is limited to the speed of the HART protocol associated with the modem (e.g., 1200 baud). In contrast, the RFID device 124 is configured according to a high speed serial bus that provides much faster communications. Thus, while communications that are associated with data stored in the non-volatile memory 208 depend upon loop power, the speed at which data (previously polled from the field device 122) can be accessed is a significant improvement over polling the field device 122 directly.

A related advantage of the RFID device 124 arises from the fact that high speed communications are possible while the field device is powered. Frequently there is a no-touch rule in effect for process control equipment when the process is in operation such that engineers or other maintenance personnel can only access alerts, alarms, or diagnostic data for a field device via the plant database. While this information is accessible from a control room and/or remote terminal in a maintenance shop, such information is largely unavailable when personnel are local to the field device because known wireless transceivers are limited (e.g., by the speed/frequency of communications, as described above) and establishing a hardwired connection to a field device may require unscrewing a terminal cap (which may violate plant safety policy) and/or taking the field device out of service, thereby disrupting operations of the plant. However, with the example RFID device 124, the high communication speeds and the wireless nature of the communications overcomes these obstacles for personnel with a handheld RFID reader/writer (e.g., the RFID reader/writer 206) at or near the location of the field device 122.

While an example manner of implementing the RFID device 124 of FIG. 1 is illustrated in FIG. 2, one or more of the elements, processes and/or devices illustrated in FIG. 2 may be combined, divided, re-arranged, omitted, eliminated and/or implemented in any other way. Further, the example HART modem 202, the example microcontroller 204, the example RAM 207, the example non-volatile memory 208, and the example main RFID processor 212, the example RFID onboard memory 214, and the example RFID antenna 216 of the example RFID tag 210, and/or, more generally, the example RFID device 124 of FIG. 2 may be implemented by hardware, software, firmware and/or any combination of hardware, software and/or firmware. Thus, for example, any of the example HART modem 202, the example microcontroller 204, the example RAM 207, the example non-volatile memory 208, and the example main RFID processor 212, the example RFID onboard memory 214, and the example RFID antenna 216 of the example RFID tag 210, and/or, more generally, the example RFID device 124 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). Further still, the example RFID device 124 of FIG. 2 may include one or more elements, processes and/or devices in addition to, or instead of, those illustrated in FIG. 2, and/or may include more than one of any or all of the illustrated elements, processes and devices.

Figure 3:
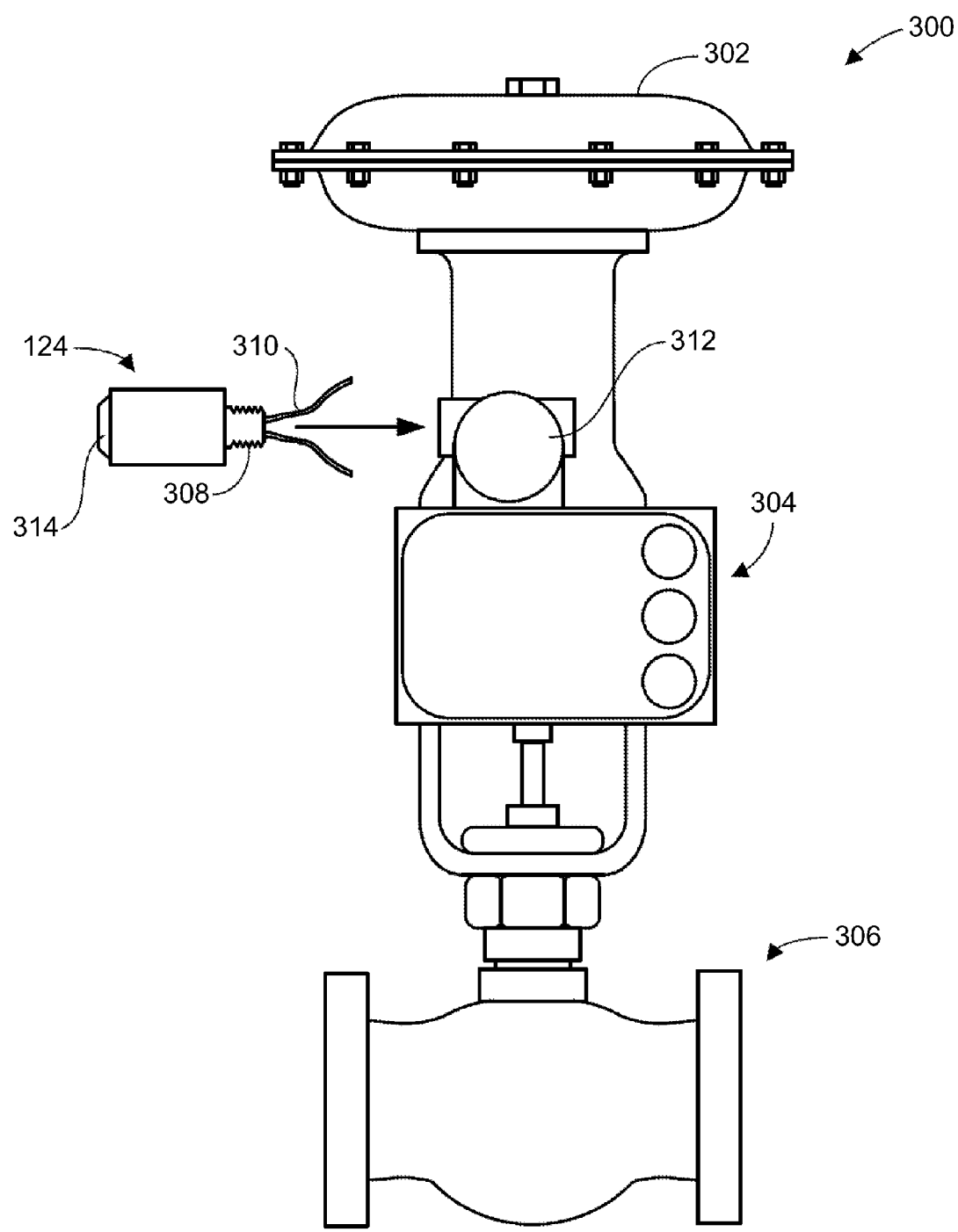
FIG. 3 illustrates a particular implementation of the example RFID device of FIGS. 1 and/or 2 to be coupled to an actuator via a valve controller to control a valve.

FIG. 3 illustrates a particular implementation of the example RFID device of FIGS. 1 and/or 2 to be physically and operatively coupled to an example field device 300 including an actuator 302 and a valve controller 304 coupled to a valve 306. More particularly, in some examples, as shown in FIG. 3, the RFID device 124 is physically coupled to the field device 300 by fastening threads 308 of the RFID device 124 to the valve controller 304. Additionally, in some examples, the RFID device 124 is operatively coupled to the field device 300 by connecting wires 310 of the RFID device 124 to the valve controller 304 within a terminal box 312 of the valve controller 304. In some examples, the fastening threads 308 conform to standard piping threads such that the RFID device can be retrofitted to many existing field devices. In other examples, the RFID device 124 is built directly within a field device.

In some examples, the RFID antenna 216 (FIG. 2) of the RFID device 124 is located at an end 314 of the RFID device 124 opposite the threads 308. In some examples, the fastening threads 308 can be used in conjunction with standard pipe fittings (e.g., an elbow) to orient the RFID antenna 216 in any desired direction independent of the valve controller 304. In other examples, the RFID antenna 216 may be omni-directional such that orientation of the RFID device 124 is less significant.

As shown in the illustrated example of FIG. 3, by physically connecting and wiring the RFID device 124 to the field device 300, a hazardous area rating can be achieved that enables wireless communications to a nearby RFID reader/writer (e.g., the RFID reader/writer 206). Furthermore, the physical attachment of the RFID device 124 to the field device 300 enables the RFID tag 210 of the RFID device 124 to be permanently associated with the field device 300 (i.e., for as long as the RFID device 124 remains fastened to the field device 300) even when the field device 300 is taken out of service, removed to a new location, and/or isolated from the rest of the process control system (e.g., for maintenance and/or repair).

Figure 4:
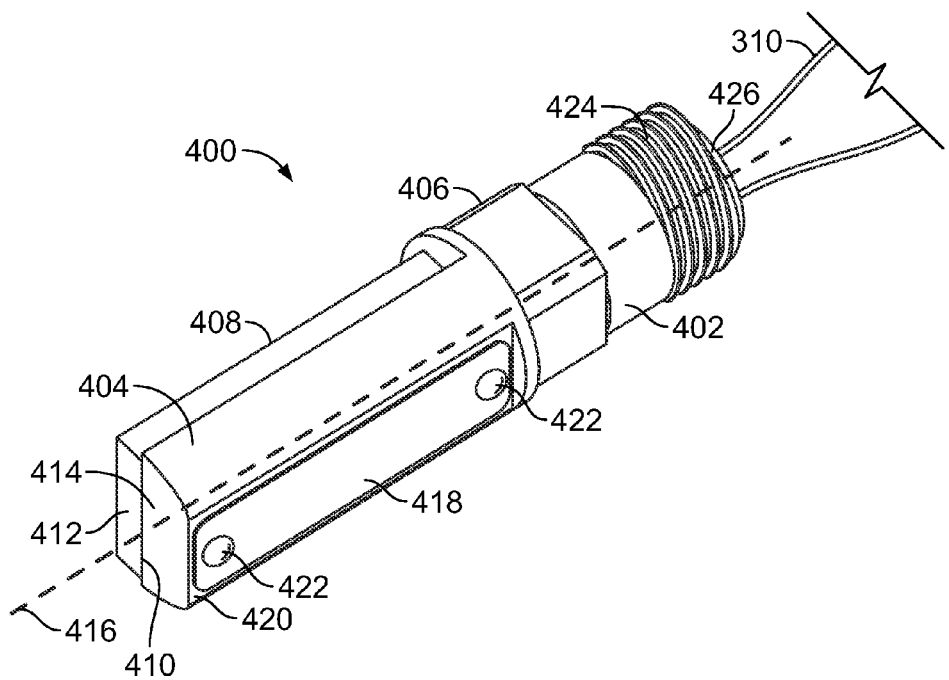
FIG. 4 is an isometric view of an example RFID mounting device in accordance with the teachings herein.

FIG. 4 illustrates an example RFID mount or adapter 400 in accordance with the teachings herein. The example RFID adapter 400 includes a first portion 402 and a second portion 404 opposite the first portion 402. As illustrated in FIG. 4, the first portion 402 and the second portion 404 form an elongated shaft or rod. The example RFID adapter 400 includes wrench flats 406 positioned between the first portion 402 and the second portion 404. In some examples, the first portion 402, the second portion 404, and the wrench flats 406 form a unitary piece or structure that is manufactured via extrusion, die casting and/or machining. In other examples, the first portion 402, the second portion 404, and the wrench flats 406 are separate pieces or structures coupled together via welding, bonding, adhesives and/or mechanical joining. The RFID adapter 400 is composed of, for example, a metallic material (e.g., aluminum, stainless steel) and/or a non-metallic material (e.g., plastic) that maintains the hazardous location rating of a field device (e.g., the field device 300 of FIG. 3) to which the RFID adapter 400 is to be coupled.

As illustrated in FIG. 4, an RFID device 408 is coupled to the second portion 404 of the RFID adapter 400. For example, the RFID device 408 is coupled to the second portion 404 via an adhesive (e.g., potting with epoxy) and/or a mechanical fastener. As illustrated in FIG. 4, the second portion 404 defines a first surface 410 that receives the RFID device 408. The first surface 410 may extend along a length of the second portion 404 of the RFID adapter 400, and the RFID device 408 may extend along a length of the first surface 410 when coupled to the second portion 404.

The RFID device 408 includes, for example, a passive RFID tag, an active RFID tag, or a semi-passive RFID tag. The example RFID device 408 of FIG. 4 includes the connecting wires 310 (FIG. 3) to draw loop power from a field device coupled to the RFID device 408 to enable an active RFID tag of the RFID device 408 to communicate to an RFID reader/writer (e.g. the RFID reader/writer 206 of FIG. 2). In examples in which the RFID device 408 includes a passive RFID tag or a semi-passive RFID tag, the RFID device 408 does not draw loop power via the connecting wires 310 to communicate to the RFID reader/writer. In some such examples, the RFID tag of the RFID device 408 receives power from an electromagnetic field (EMF) generated from the RFID reader/writer to communicate to the RFID reader/writer. In some examples, the RFID device 408 stores and transmits process control data (e.g., parameter values) and/or maintenance data to the RFID reader/writer. The maintenance data transmitted by the RFID device 408 includes information such as diagnostics, maintenance history, a parts lists, a field device serial number, a customer tag ID and/or an installation location of a field device. In some examples, the RFID device 408 receives information from the reader/writer and transmits the information to a field device coupled to the RFID device 408. In examples in which the RFID device 408 includes an active RFID tag or a semi-passive RFID tag, the RFID device 408 transmits the information to a field device via the connecting wires 310 coupled to the field device.

The RFID device 408 includes an antenna (e.g., the RFID antenna 216 of FIG. 2) that, in some examples, is a directional antenna (e.g., a phased array). While a directional antenna reduces a directional range (i.e., a beam angle) in which a radio-frequency signal is transmitted from the RFID device 408, a directional antenna increases a distance (i.e., a length) over which the radio-frequency signal may be transmitted from the RFID device 408. A directional antenna may increase a distance that a passive RFID tag, a semi-passive RFID tag and/or an active RFID tag transmits a radio-frequency signal. Increasing the distance that the radio-frequency signal is transmitted increases the distance from which an RFID reader/writer (e.g., the RFID reader/writer 206 of FIG. 2) can receive the radio-frequency signal from the RFID device 408. In some examples, the antenna of the RFID device 408 is located at an end 412 of the RFID device 408 adjacent an end 414 of the second portion 404. In some such examples, the antenna of the RFID device 408 is oriented in a direction substantially parallel to a longitudinal axis 416 (i.e., a polarization of the antenna) of the RFID adapter 400. Alternatively, the antenna may be oriented such that the radio-frequency signal is transmitted from the RFID device 408 in a direction substantially non-parallel (e.g., perpendicular) to the longitudinal axis 416 of the RFID adapter 400.

As illustrated in FIG. 4, an identification plate 418 is coupled to the second portion 404 of the RFID adapter 400. For example, the identification plate 418 displays information to enable plant personnel to identify a field device that is to receive the RFID adapter 400. The information may be laser etched, printed and/or otherwise displayed on the identification plate 418. In the illustrated example, the identification plate 418 is coupled to a second surface 420 of the second portion 404 that is opposite the first surface 410. The second surface 420 may extend along a length of the second portion 404, and the identification plate 418 may extend along a length of the second surface 420. As illustrated in FIG. 4, the identification plate 418 is coupled to the RFID adapter 400 via fasteners 422 (e.g., drive screws). For example, the identification plate 418 and the fasteners 422 are composed of a material (e.g., aluminum, stainless steel, plastic) that maintains the hazardous location rating of the field device coupled to the RFID adapter 400. Additionally or alternatively, an adhesive may be used to couple the identification plate 418 to the RFID adapter 400.

As illustrated in FIG. 4, the first portion 402 of the RFID adapter 400 defines threads 424 that are to threadably couple to a field device (e.g., the field device 300 of FIG. 3). In the illustrated example, the threads 424 are adjacent an end 426 of the first portion 402 that is opposite the end 414 of the second portion 404. In some examples, the threads 424 conform to standard piping threads (e.g., ½" NPT) that correspond to conduits of many existing field devices such that the RFID adapter 400 can be retrofitted to the existing field devices.

Figure 5:
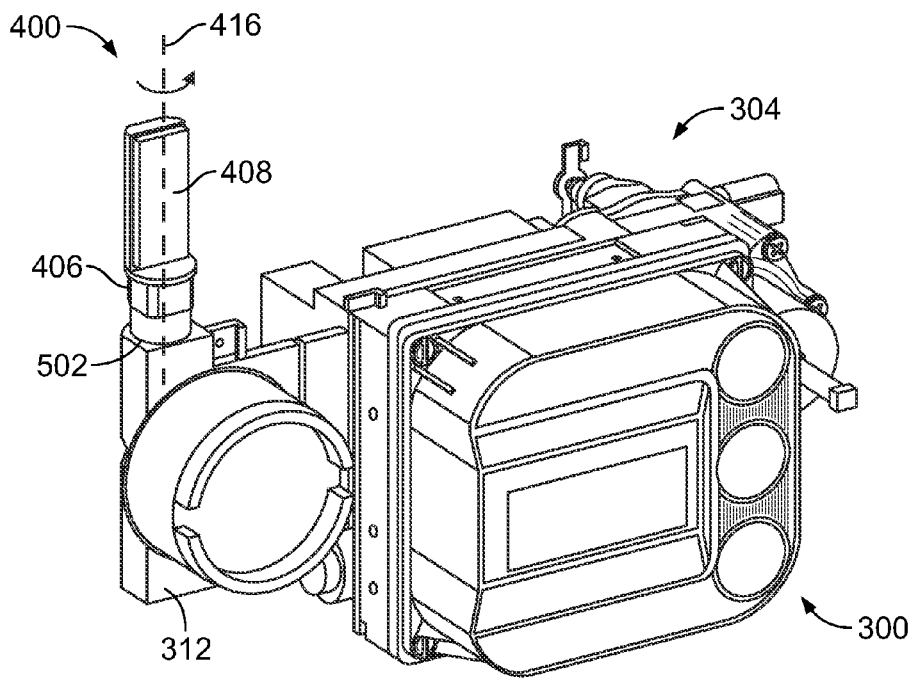
FIG. 5 is an isometric view of the example RFID mounting device of FIG. 4 coupled to a field device.

FIG. 5 illustrates the example RFID adapter 400 coupled to the field device 300. As illustrated in FIG. 5, the RFID adapter 400 is coupled to the terminal box 312 of the valve controller 304. The threads 424 (FIG. 4) of the RFID adapter 400 are threadably coupled to a threaded conduit opening 502 of the terminal box 312. In some examples, the terminal box 312 is manufactured with the threaded conduit opening 502, but the threaded conduit opening 502 of the terminal box 312 is otherwise unused when installed at the field location. The threads 424 and the threaded conduit opening 502 are male and female threaded portions, respectively, that each conform to a standard piping thread (e.g., ½" NPT) such that the RFID adapter 400 can be retrofitted to the field device 300. The wrench flats 406 enable a tool to grip and rotate the RFID adapter 400 relative to the terminal box 312 to threadably couple the RFID adapter 400 to the terminal box 312. For example, the RFID adapter 400 rotates relative to the longitudinal axis 416 of the RFID adapter 400 as the threads 424 rotatably engage the threaded conduit opening 502 of the terminal box 312.

The coupling of the threads 424 and the threaded conduit opening 502 enable the RFID adapter 400 to be rotated to orient an RFID antenna (e.g., the RFID antenna 216 of FIG. 2) toward a location from which an RFID reader/writer (e.g., the RFID reader/writer 206 of FIG. 2) is to receive the transmitted radio-frequency signal. For example, the RFID antenna of the RFID adapter 400 is oriented to transmit radio-frequency signals toward a walkway, ladder, scaffold or other nearby access point that plant personnel can easily access when carrying the RFID reader/writer. In some examples, the field device 300 is installed at a field location that is a substantial distance (e.g., a distance in excess of 30 feet) from the nearest access point. In some such examples, the RFID antenna of the RFID device 408 is a directional antenna that enables the RFID device 408 to transmit the radio-frequency signal to the nearest access point.

The radio-frequency signals transmitted by the RFID device 408 may include maintenance and/or process control information pertaining to the field device 300. By directing the RFID device 408 to a convenient access point, the RFID adapter 400 enables plant personnel to obtain information pertaining to the field device 300 in a safe and convenient manner by substantially reducing the need for plant personnel to go to hazardous and/or inconvenient locations. For example, the RFID adapter 400 enables plant personnel to obtain the information without having to gain direct visual access to a nameplate coupled to the field device 300 that is difficult to read due to an elevation or orientation of the field device, nearby thermal or acoustic insulation, paint overspray, grit blast damage, etc.

When threadably engaged to the threaded conduit opening 502, an orientation of the RFID device 408 can be adjusted by rotating the RFID adapter 400 relative to the longitudinal axis 416 of the RFID adapter 400. For example, in instances in which the field device is moved to a different field location, the orientation of the RFID device 408 can be adjusted to be directed to an access point near the new location of the field device 300. The orientation of the RFID device 408 may also be adjusted if plant equipment near the field device 300 is moved and/or repositioned in such a manner as to block transmission of radio-frequency signals to the otherwise convenient access location.

The threads 424 of the illustrated example enable the RFID adapter 400 to be easily decoupled from the terminal box 312 of the valve controller 304. In some examples, the RFID adapter 400 can be decoupled from the field device 300 when an RFID tag associated with another field device fails and subsequently coupled to the other field device to replace the defective RFID tag. In some examples, if the valve controller 304 and/or the terminal box 312 of the field device 300 fails, the RFID adapter 400 can be decoupled from the terminal box 312 and the RFID adapter 400 can subsequently be threadably coupled to a replacement field device installed at the field location. Further, if the RFID device 408 fails, the RFID adapter 400 can be decoupled from the field device 300 and a replacement RFID adapter 400 can be threadably coupled to the field device 300. Alternatively, in such instances, the RFID adapter 400 may be decoupled from the field device 300, the RFID device 408 may be removed from the RFID adapter 400 and replaced with another RFID tag, and the RFID adapter 400 may subsequently be recoupled to the field device 300.

To enable plant personnel to identify which field device is to receive the RFID adapter 400, the identification plate 418 (FIG. 4) that displays such information is coupled to the RFID adapter 400. The RFID tag 418 enables plant personnel to identify the field device 300 that is to receive the RFID adapter 400 without requiring the RFID tag 418 to transmit radio-frequency signals prior to the RFID adapter 400 being installed. For example, the identification plate 418 may include a field device serial number provided by manufacturer, distributor and/or vendor that identifies a type of field device for which the RFID adapter 400 is designated. Additionally or alternatively, the identification plate 418 may include a customer tag ID provided by plant personnel to identify to which field device within a plant the RFID adapter 400 is to be coupled.

Figure 6:
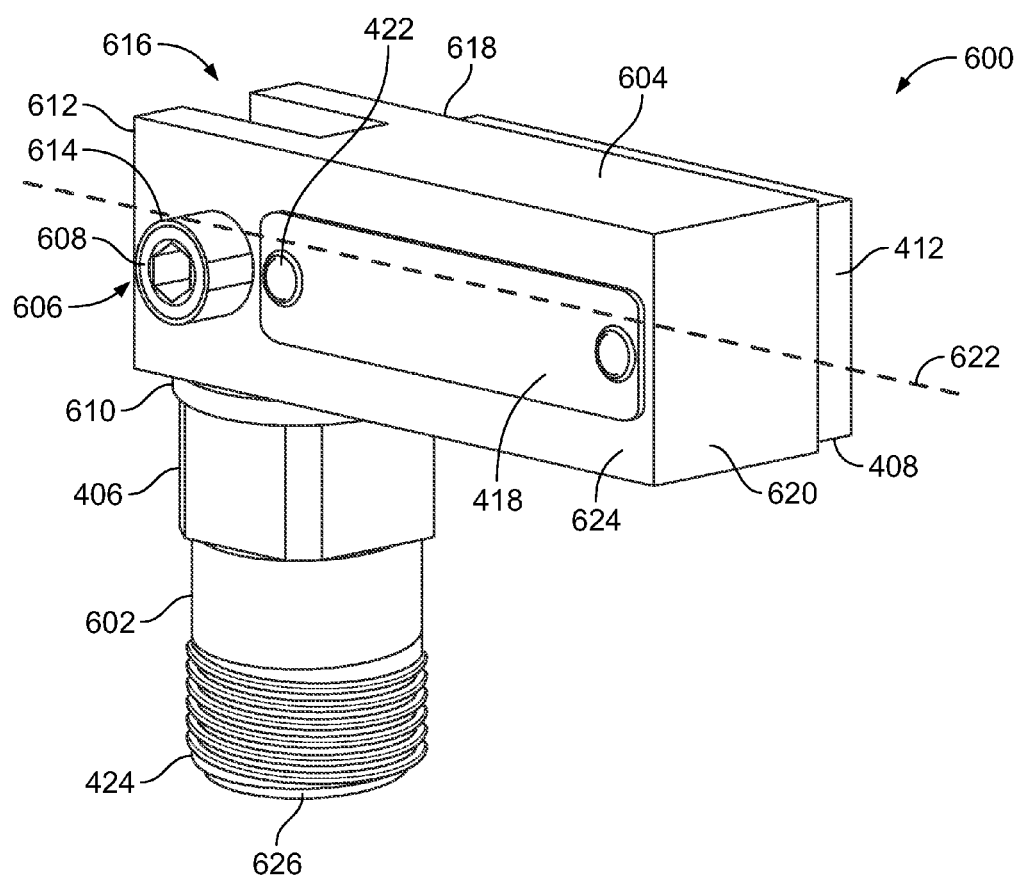
FIG. 6 is an isometric view of another example RFID mounting device in accordance with the teachings herein.

FIG. 6 illustrates the RFID device 408 coupled to another example RFID mount or adapter 600 in accordance with the teachings herein. The example RFID adapter 600 includes a first portion 602 and a second portion 604 opposite and/or adjacent the first portion 602. As illustrated in FIG. 6, the second portion 604 of the RFID adapter 600 is substantially perpendicular to the first portion 602 of the RFID adapter 600. The example RFID adapter 600 includes a pivot joint or hinge 606 that rotatably and/or hingeably couples the first portion 602 and the second portion 604. As illustrated in FIG. 6, the hinge 606 includes a fastener 608 that rotatably couples a first end 610 of the first portion 602 to a first end 612 of the second portion 604. For example, the fastener 608 is a bolt 614 (e.g., a bolt with a hexagonal recess) that extends through an aperture defined by the first ends 610, 612 of the respective first and second portions 602, 604. The position of the second portion 604 relative to the first portion 602 is adjusted by loosening or removing the fastener 608, decoupling and rotating the second portion 604 about the hinge 608, and subsequently tightening or re-installing the fastener 608 to fix the position of the second portion 604 relative to the first portion 602.

As illustrated in FIG. 6, the second portion 604 has a substantially rectangular profile. The first end 612 of the second portion 604 defines an opening, slot or groove 616 to receive the first end 610 of the first portion 602. A first surface 618 of the second portion 604 receives the RFID device 408. The first surface 618 is substantially flat to enable the RFID device 408 to be securely fastened to the first surface 618 of the second portion 604. For example, the RFID device 408 is coupled to the first surface 618 via an adhesive and/or a mechanical fastener. As illustrated in FIG. 6, the end 412 of the RFID device 408 is adjacent a second end 620 opposite the first end 612 of the second portion 604. In some such examples, the second end 620 of the second portion 604 does not prevent radio-frequency signals from being transmitted in a direction substantially parallel to a longitudinal axis 622 of the second portion 604.

A second surface 624 of the second portion 604 of the example RFID adapter 600 is opposite the first surface 618 and receives the identification plate 418. In the illustrated example, the second surface 624 is substantially flat to enable the identification plate 418 to be securely fastened to the second portion 604 via the fasteners 422. In some examples, the second portion 604 of the RFID adapter 600 is composed of a metallic material that maintains the hazardous location rating of a field device (e.g., a field device 300 of FIGS. 7A and 7B) that is to receive the RFID adapter 600. In other examples, the second portion 604 is composed of a non-metallic material (e.g., a plastic) that maintains the hazardous location rating of the field device and increases the transmit range of the RFID device 408 coupled to the second portion 604.

As illustrated in FIG. 6, a second end 626 of the first portion 602 opposite the first end 610 defines the threads 424. In some examples, the threads 424 conform to a standard piping thread (e.g., ½" NPT) that corresponds to conduit openings of many existing field devices such that the RFID adapter 600 can be retrofitted to the existing field devices. In other examples, the threads 424 may couple via a tee, an elbow, a street elbow, or a nipple to accommodate other arrangements to existing field devices.

As illustrated in FIG. 6, the first portion 602 of the RFID adapter 600 includes the wrench flats 406 that enable the RFID adapter 600 to be rotated via a tool. For example, the wrench flats 406 of the RFID adapter 600 are adjacent the first end 610 of the first portion 602. The first portion 602 is composed of, for example, a metallic material (e.g., aluminum, stainless steel) that matches the material of and/or maintains the hazardous location rating of the field device that is to receive the RFID adapter 600. In some examples, the first portion 602 and the second portion 604 are composed of different materials. For example, the first portion 602 may be composed of stainless steel and the second portion 604 may be composed of a plastic material.

Figure 7A:
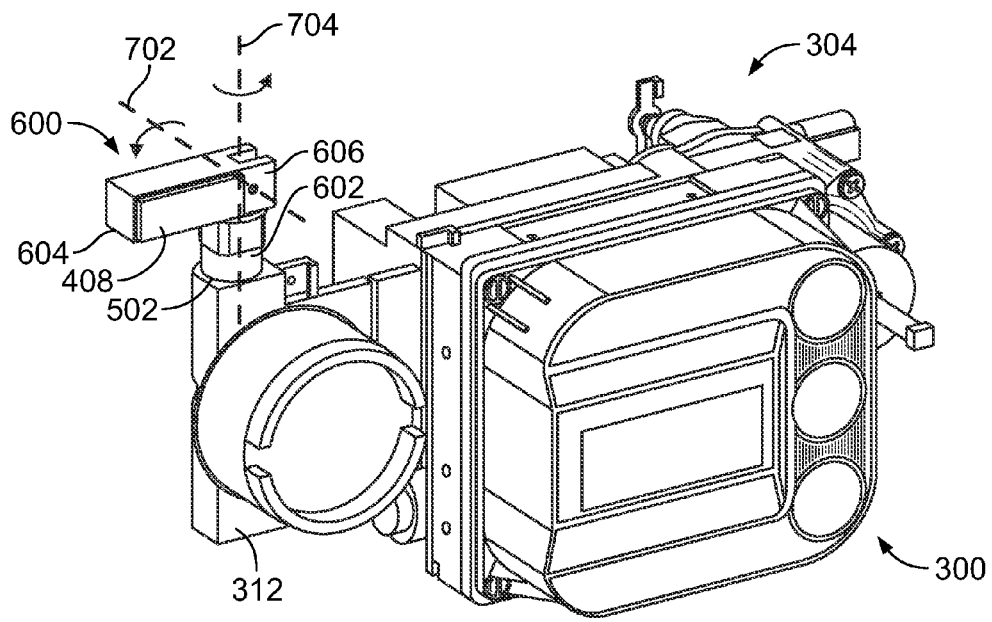
FIG. 7A is an isometric view of the example RFID mounting device of FIG. 6 coupled to a field device in a first orientation.
Figure 7B:
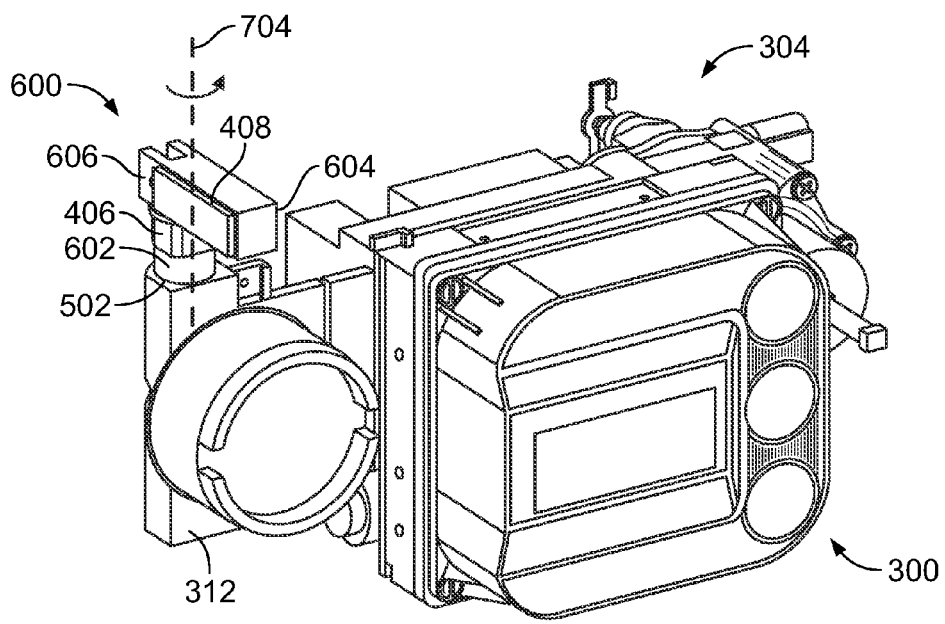
FIG. 7B is an isometric view of the example RFID mounting device of FIG. 6 coupled to a field device in a second orientation.

FIGS. 7A and 7B illustrate the example RFID adapter 600 coupled to the terminal box 312 of the valve controller 304. For example, the threads 424 (FIG. 6) of the RFID adapter 600 are coupled to the threaded conduit opening 502 of the terminal box 312. The threads 424 and the threaded conduit opening 502 are male and female portions, respectively, that conform to a standard piping thread (e.g., ½" NPT) such that the RFID adapter 600 can be retrofitted to the field device 300.

FIG. 7A depicts the RFID adapter 600 positioned in a first orientation relative to the field device 300. As illustrated in FIG. 7A, the hinge 606 of the RFID adapter 600 enables the second portion 604 to be rotated about to an axis 702 that is perpendicular to the longitudinal axis 622 (FIG. 6) of the second portion 604 and perpendicular to a longitudinal axis 704 of the of the first portion 602. In some examples, the hinge 606 provides the second portion 604 with 180° of rotation. For example, the hinge 606 enables the second portion 604 to be rotated to a position substantially perpendicular to the first portion 602 in a first direction, to a position substantially in-line with (i.e., parallel to) the first portion 602 and/or to a position substantially perpendicular to the first portion 602 in a second direction opposite the first direction.

FIG. 7B depicts the RFID adapter 600 positioned in a second orientation relative to the field device 300 that is different than the first orientation of FIG. 7A. For example, the threads 424 of the first portion 602 enable the RFID adapter 600 to be rotated from the first orientation of FIG. 7A to the second orientation of FIG. 7B. The wrench flats 406 enable a tool to rotate the RFID adapter 600 relative to the longitudinal axis 704 of the first portion 602.

Because the RFID device 408 is coupled to the second portion 604 of the RFID adapter 600, an orientation of the RFID device 408 is adjusted when the first portion 602 is rotated relative to the longitudinal axis 704 and/or when the second portion is rotated relative to the axis 702. For example, the RFID adapter 600 enables the orientation of the RFID device 408 to be adjusted relative to the axes 702, 704 to direct the radio-frequency signals transmitted from the RFID tag 216 toward a location accessible to plant personnel carrying an RFID reader/writer (e.g., the RFID reader/writer 206 of FIG. 2). The access point may be, for example, a nearby walkway, ladder or scaffold. In some examples, the RFID adapter 600 enables the orientation of the RFID device 408 to be adjusted relative to the axes 702, 704 when the RFID reader/writer cannot receive the radio-frequency signals of the RFID device 408 from the access point. For example, the RFID adapter 600 enables the orientation of the RFID device 408 to be adjusted when the field device 300 and/or nearby plant equipment is moved or repositioned in such a manner as to block the RFID reader/writer 206 from receiving the radio-frequency signals transmitted from the RFID device 408.

In some examples, an orientation and/or position of the threaded conduit opening 502 relative to the field device 300 or nearby plant equipment causes the field device 300 and/or the plant equipment to interfere with rotation and/or adjustment of the RFID adapter 600. In some such examples, the second portion 604 is decoupled from the first portion 602 at the hinge 606, the first portion 602 is then coupled to the threaded conduit opening 502 and rotated relative to the field device 300, and the second portion is subsequently coupled to the first portion 602 via the hinge 606 and rotated to the desired orientation.

Further, the threads 424 enable the RFID adapter 600 to be decoupled from the field device 300 to enable plant personnel to maintain or repair the field device 300 and/or the RFID device 408. The threads 424 may also enable the RFID adapter 600 to be decoupled from the field device 300 and coupled to another field device if an RFID tag associated with the other field device fails and is to be replaced.

To enable plant personnel to identify which field device is to receive the RFID adapter 600, the identification plate 418 (FIG. 6) that displays such information is coupled to the RFID adapter 600. The identification plate 418 enables plant personnel to identify the field device 300 that is to receive the RIFD adapter 600 without requiring the RFID tag 418 to transmit the radio-frequency signals prior to being coupled to the field device 300. For example, the identification plate 418 provides information relating to a type of field device and/or a particular field device within the plant location that is designated to receive the RFID adapter 600.

Figure 8:
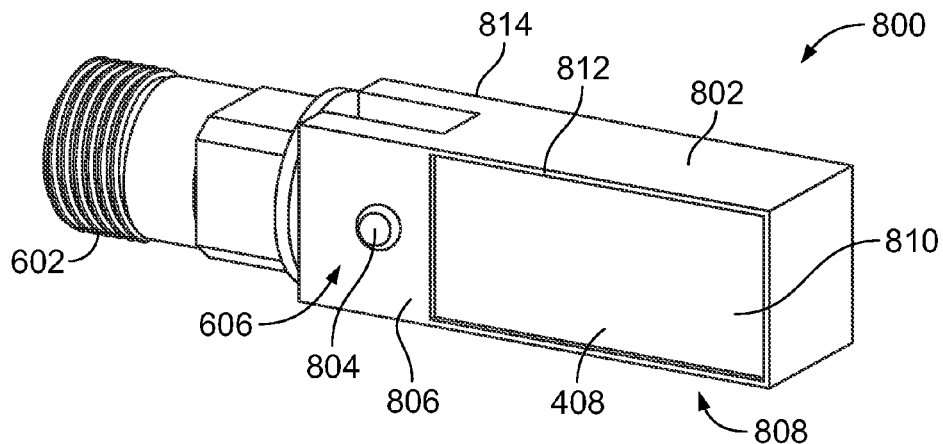
FIG. 8 is an isometric view of another example RFID mounting device in accordance with the teachings herein.

FIG. 8 illustrates the RFID device 408 coupled to another example RFID mount or adapter 800 in accordance with the teachings herein. The example RFID adapter 800 includes the first portion 602, a second portion 802 opposite the first portion 602, and the hinge 606 that rotatably and/or hingeably couples the first portion 602 and the second portion 802. For example, to couple the second portion 802 to the first portion 602, the hinge 606 includes the bolt 614 (FIG. 6) that extends through an aperture defined by the first and second portions 602, 802 and is received by a capscrew 804.

As illustrated in FIG. 8, the second portion 802 of the RFID adapter 800 has a substantially rectangular profile. The second portion 802 includes a first surface 806 that receives the RFID device 408. As illustrated in FIG. 8, the first surface 806 defines a depression or indentation 808 that is to receive the RFID device 408. For example, the RFID device 408 is coupled to the first surface 806 within the indentation 808 such that a surface 810 of the RFID device 408 is substantially flush and/or even with the first surface 806 of the second portion 802. When the RFID device 408 is positioned and/or embedded within the indentation 808, an outer ridge 812 of the indentation 808 surrounds the peripheral edge of the RFID device 408 to protect the RFID device 408 from being damaged. For example, the RFID device 408 is coupled to the first surface 806 within the indentation 808 via an interference fit, an adhesive (e.g., potting with epoxy) and/or a mechanical fastener. The illustrated RFID adapter 800 includes a second surface 814 opposite the first surface 806 that receives an identification plate (e.g., the identification plate of FIGS. 4 and 6). In some examples, the second portion 802 is composed of a metallic material to maintain the hazardous location rating of a field device (e.g., the field device 300 of FIG. 3) that is to receive the RFID adapter 800. In other examples, the second portion 802 is composed of a non-metallic material (e.g., a plastic) to maintain the hazardous location rating of the field device and increase the range of the RFID device 408 coupled to the second portion 802.

Figure 9:
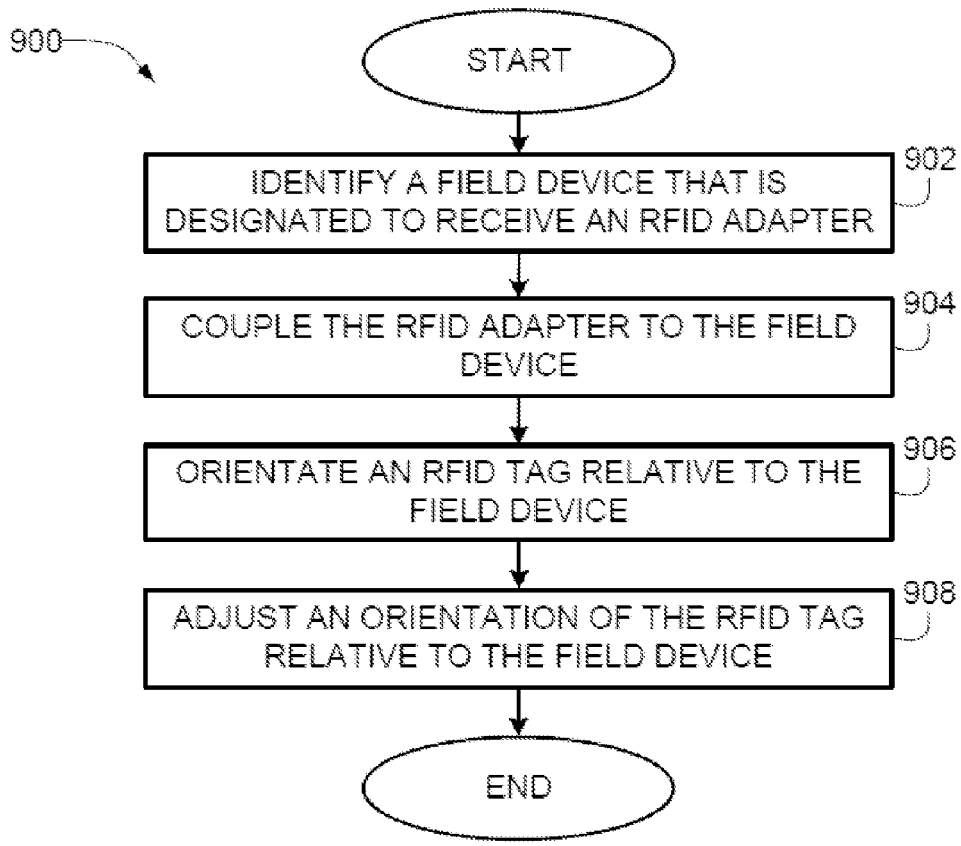
FIG. 9 is a flowchart of an example method for coupling the example RFID mounting device of FIGS. 4, 6 and/or 8 to a field device in accordance with the teachings herein.
Figure 10:
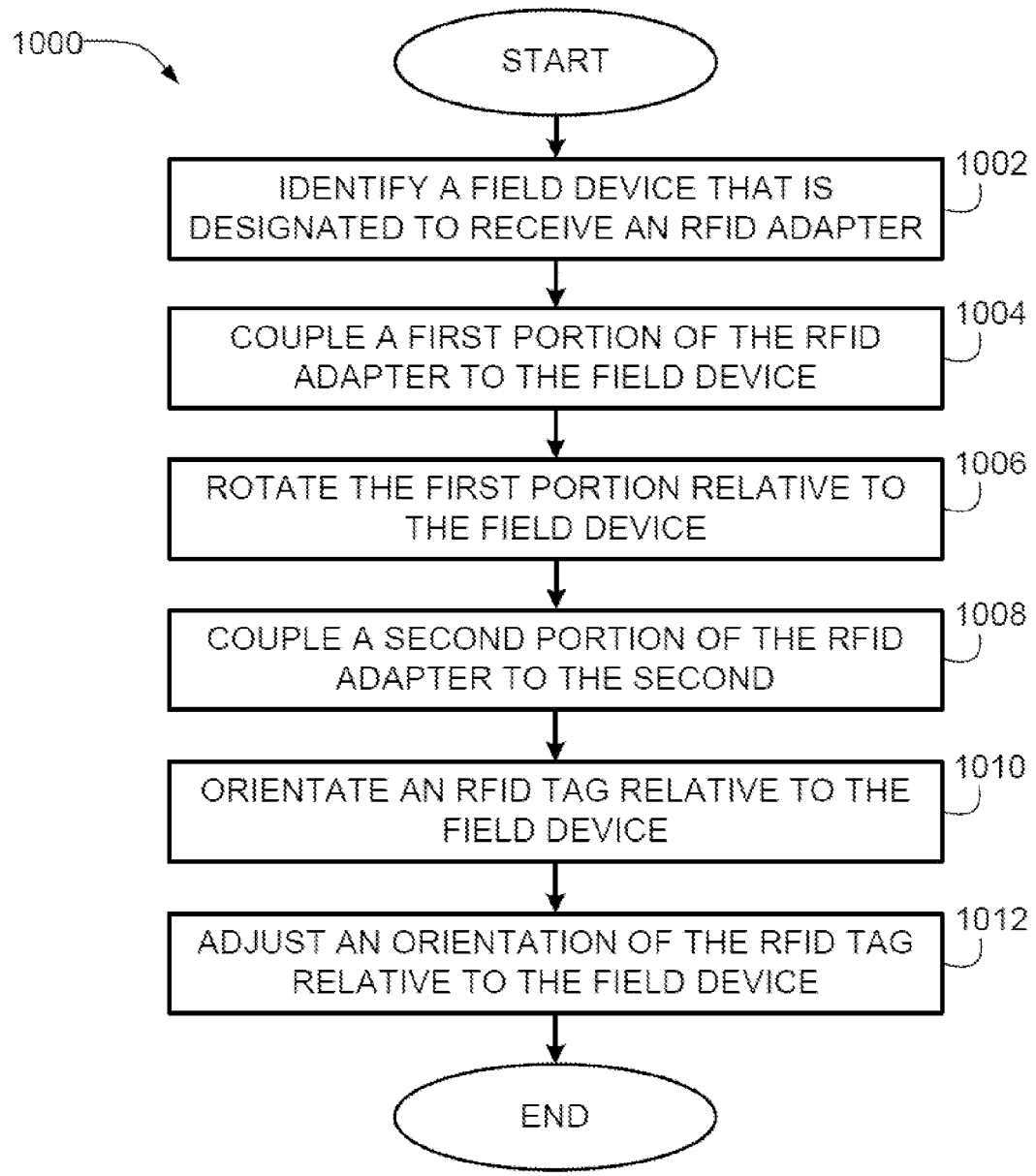
FIG. 10 is a flowchart of another example method for coupling the example RFID mounting device of FIGS. 6 and/or 8 to a field device in accordance with the teachings herein.

FIGS. 9 and 10 are flowcharts representative of example methods 900 and 1000, respectively, for coupling an example RFID mount or adapter to a field device. Although the example methods 900 and 1000 are described with reference to the respective flowcharts illustrated in FIGS. 9 and 10, many other methods of assembling an example modular instrument may alternatively be used. For example, the order of execution of the blocks may be changed, and/or some of the blocks described may be changed, eliminated, or combined.

The example methods 900 and 1000 for coupling an example RFID mount or adapter are discussed in connection with the example RFID adapter 400 of FIGS. 4-5, the example RFID adapter 600 of FIGS. 6-7B and/or the example RFID adapter 800 of FIG. 8. Because the example methods 900 and 1000 may be used to assemble the example RFID adapter 400 of FIGS. 4-5, the example RFID adapter 600 of FIGS. 6-7B and/or the example RFID adapter 800 of FIG. 8, those components identified in FIGS. 4-8 having functions substantially similar or identical to the functions of components described below will not be described in detail again. Instead, the same reference numbers will be used for like structures.

The example method 900 disclosed herein may start by identifying a field device (e.g., the field device 300 of FIGS. 5, 7A and 7B) that is designated to receive an RFID adapter (e.g., the RFID adapter 400 of FIG. 4, the RFID adapter 600 of FIG. 6, the RFID adapter 800 of FIG. 8) (block 902). For example, the field device is identified via information displayed on an identification plate (e.g., the identification plate 418 of FIGS. 4 and 6) that is coupled to the RFID adapter. The information displayed on the identification plate includes, for example, a field device serial number that indicates a type of designated field device and/or a customer tag ID that indicates a particular field device installed within a plant location.

After the field device is identified, the RFID adapter is coupled to the field device (block 904). For example, the field device is coupled to the field device by threadably coupling threads (e.g., the threads 424 of FIGS. 4 and 6) of the RFID adapter to a threaded conduit opening (e.g., the threaded conduit opening 502 of FIGS. 5, 7A and 7B) of a terminal box (e.g., the terminal box 312 of FIGS. 5, 7A and 7B) of the field device. In some examples, to threadably couple the RFID adapter to the threaded conduit opening, the RFID adapter is rotated relative to the threaded conduit opening by rotating a tool that engages wrench flats (e.g., the wrench flats 405 of FIGS. 4 and 6) of the RFID adapter.

Once the RFID adapter is coupled to the field device, an RFID tag (e.g., the RFID device 408 of FIGS. 4, 6 and 8) coupled to the RFID adapter is oriented relative to the field device by rotating the RFID adapter (e.g., the RFID adapter 400 of FIG. 4, the RFID adapter 600 of FIG. 6, the RFID adapter 800 of FIG. 8) relative to a longitudinal axis (e.g., the longitudinal axis 416 of FIG. 4, the longitudinal axis 704 of FIG. 7B) of the RFID adapter (e.g., the RFID adapter 400 of FIG. 4) or relative to a first portion (e.g., the first portion 602 of FIGS. 6 and 8) of the RFID adapter (e.g., the RFID adapter 600 of FIG. 6, the RFID adapter 800 of FIG. 8) (block 906). For example, the RFID tag is oriented relative to the field device by rotating the RFID adapter by using the tool that engages the wrench flats. Orientating the RFID tag relative to the field device enables an RFID antenna (e.g., the RFID antenna 216 of FIG. 2) of the RFID tag to be directed toward a location from which an RFID reader/writer (e.g., the RFID reader/writer 206) is to receive a radio-frequency signal transmitted by the RFID tag. In some examples, the RFID tag is oriented to direct the RFID antenna toward a walkway, ladder, scaffold or other nearby access point from which plant personnel can conveniently carry the RFID reader/writer. Directing the RFID tag to the convenient access point enables the plant personnel to safely and/or conveniently obtain data (e.g., maintenance data, process control data) related to the field device.

After the RFID tag is oriented relative to the field device, the orientation of the RFID tag relative to the field device 300 may be adjusted (block 908). For example, the orientation of the RFID tag is adjusted by rotating the RFID adapter (e.g., the RFID adapter 400 of FIG. 4, the RFID adapter 600 of FIG. 6, the RFID adapter 800 of FIG. 8) relative to a longitudinal axis (e.g., the longitudinal axis 416 of FIG. 4, the longitudinal axis 704 of FIG. 7B) of the RFID adapter (e.g., the RFID adapter 400 of FIG. 4) or relative to a first portion (e.g., the first portion 602 of FIGS. 6 and 8) of the RFID adapter (e.g., the RFID adapter 600 of FIG. 6, the RFID adapter 800 of FIG. 8). The orientation of the RFID tag may be adjusted by using the tool that engages the wrench flats. In some examples, the orientation of the RFID tag is to be adjusted when the field device and/or nearby equipment is moved and/or repositioned such that the RFID reader/writer cannot receive the radio-frequency signals from RFID tag at the access point.

The example method 1000 disclosed herein is another method for coupling an RFID adapter (e.g., an RFID adapter 600 of FIG. 6, an RFID adapter 800 of FIG. 8) to a field device (e.g., the field device 300 of FIGS. 7A and 7B). The method 1000 may start by identifying the field device that is to receive the RFID adapter (block 1002). After the field device is identified, a first portion (e.g., the first portion 602 of FIGS. 6 and 8) of the RFID adapter is coupled to the field device (block 1004). For example, the first portion is coupled to the field device by threadably coupling threads (e.g., the threads 424 of FIGS. 6 and 8) of the RFID adapter to a threaded conduit opening (e.g., the threaded conduit opening 502 of FIGS. 7A and 7B) of a terminal box (e.g., the terminal box 312 of FIGS. 7A and 7B) of the field device. In some examples, to threadably couple the threads to the threaded conduit, the RFID adapter is rotated relative to the threaded conduit by rotating a tool when the tool engages wrench flats (e.g., wrench flats 406 of FIGS. 6) of the RFID adapter.

Further, the method 1000 includes rotating the first portion of the RFID adapter to a desired orientation relative to the field device (block 1006). For example, the first portion is rotated relative to the field device by rotating the tool when the tool engages the wrench flats of the first portion relative to a longitudinal axis (e.g., the longitudinal axis 704 of FIG. 7B) of the first portion. The desired orientation of the first portion may be based on a position of a walkway, ladder, scaffold or other nearby access point relative to the field device.

After the first portion is rotated relative to the field device, a second portion (e.g., the second portion 604 of FIG. 6, the second portion 802 of FIG. 8) of the RFID adapter is coupled to the first portion of the RFID adapter (block 1008). For example, a first end (e.g., the first end 612 of FIG. 6) of the second portion is coupled to a first end (e.g., the first end 610 of FIG. 6) of the first portion at a joint or hinge (e.g., the hinge 606 of FIGS. 6 and 8) via a fastener (e.g., the fastener 608 of FIG. 6). Coupling the second portion to the first portion at the hinge may include extending a socket (e.g., the bolt 614 of FIG. 6) through an aperture defined by the first ends of the respective first and second portions and coupling the socket to a cap (e.g., the capscrew 804 of FIG. 8).

The method for coupling an RFID adapter to a field device also includes orientating an RFID tag (e.g., an RFID device 408 of FIGS. 6 and 8) coupled to the second portion of the RFID adapter relative to the field device (block 1010). Orientating the RFID tag is includes rotating the second portion relative to the first portion via the hinge. For example, the second portion is rotated relative to an axis (e.g., the axis 702 of FIG. 7A) perpendicular to a longitudinal axis of the second portion (e.g., the longitudinal axis 622 of FIG. 6) and perpendicular to a longitudinal axis of the first portion (e.g., the longitudinal axis 704 of FIG. 7B). The second portion may be rotated relative to the first portion by loosening or removing the fastener, rotating the hinge, and subsequently tightening or reinstalling the fastener to fix the second portion relative to the first portion. In some examples, the second portion is oriented to be in-line with (i.e., parallel to) the first portion. In other examples, the second portion is oriented to be substantially non-parallel (e.g., perpendicular to) the first portion. Further, orientating the RFID tag may include rotating the first portion of the RFID adapter relative to the field device relative to the longitudinal axis of the first portion.

Orientating the RFID tag relative to the field device enables an RFID antenna (e.g., the RFID antenna 216 of FIG. 2) of the RFID tag to be directed toward a location from which an RFID reader/writer (e.g., the RFID reader/writer 206) can receive a radio-frequency signal transmitted from the RFID tag. In some examples, the RFID antenna of the RFID tag is directed toward a walkway, ladder, scaffold or other nearby access point that plant personnel can access while carrying the RFID reader/writer. By directing the RFID tag to a convenient access point, the plant personnel may safely and/or conveniently obtain information transmitted by the RFID tag that is related to the field device.

After the RFID tag is oriented relative to the field device, the orientation of the RFID tag relative to the field device may be adjusted (block 1012). For example, the orientation of the RFID tag is adjusted by rotating the first portion of the RFID adapter relative to the field device and/or rotating the second portion of the RFID adapter relative to the first portion.

Although certain example apparatus have been described herein, the scope of coverage of this patent is not limited thereto. On the contrary, this patent covers all methods, apparatus and articles of manufacture fairly falling within the scope of the amended claims either literally or under doctrine of equivalents.

What is claimed is:

1. An apparatus comprising:
a mount to couple a radio-frequency identification tag to a field device, the mount being rotatable relative to the field device to adjust a direction of a signal of the radio-frequency identification tag relative to a radio-frequency identification reader, the mount comprising:
a first portion having a threaded portion that is to rotatably couple the mount to the field device to enable the first portion to rotate about a longitudinal axis of the first portion to adjust the direction of the signal of the radio-frequency identification tag;
a second portion to receive the radio-frequency identification tag; and
a joint to rotatably couple the first portion and the second portion, the joint to enable the second portion to rotate about a second axis that intersects the longitudinal axis of the first portion to adjust the direction of the signal of the radio-frequency identification tag.

2. An apparatus of claim 1, wherein the mount further includes wrench flats to enable the mount to be rotated relative to the longitudinal axis of the first portion.

3. An apparatus of claim 1, wherein the second axis is perpendicular to the longitudinal axis of the first portion such that the joint enables the second portion to transition between being parallel and perpendicular to the first portion.

4. The apparatus of claim 3, wherein the first portion is capable of completing a full rotation about the longitudinal axis of the first portion and the second portion is capable of rotating about 180 degrees relative to the second axis to adjust the direction of the signal of the radio-frequency identification tag.

5. An apparatus of claim 1, wherein the mount comprises a metallic material to increase a range that a radio-frequency signal is to be transmitted from the radio-frequency identification tag.

6. An apparatus of claim 1, wherein the second portion is removably coupled to the first portion via the joint, the second portion is to decouple from the first portion to reposition the second portion relative the first portion when nearby equipment impedes rotation of the second portion about the second axis.

7. An apparatus of claim 1, wherein the second portion further includes a first flat surface and a second flat surface opposite the first flat surface, the first flat surface to receive the radio-frequency identification tag, the second flat surface to receive an identification plate.

8. The apparatus of claim 1, wherein the first portion includes a first end and a second end opposite the first end, the threaded portion is adjacent the first end and the joint is adjacent the second end of the first portion.

9. The apparatus of claim 1, wherein the mount is unenclosed when coupled to the field device.

10. An apparatus comprising:
a radio-frequency identification tag; and
an adapter having a first portion and a second portion opposite the first portion, the radio-frequency identification tag is coupled to the second portion, the first portion includes threads to rotatably couple the adapter to a field device and to enable the adapter to rotate relative to a longitudinal axis of the first portion to adjust a direction of a signal of the radio-frequency identification tag relative to a radio-frequency identification reader, the first portion includes a first end and a second end opposite the first end, the first end is to rotatably couple to the field device via the threads, the second end is to be hingeably coupled to the second portion via a joint.

11. An apparatus of claim 10, wherein the radio-frequency identification tag is to be powered by the radio-frequency identification reader to transmit process control data of the field device to which the adapter is rotatably coupled.

12. The apparatus of claim 10, wherein the joint is to enable the second portion to rotate about a second axis that intersects the longitudinal axis of the first portion to adjust the direction of the signal of the radio-frequency identification tag relative to the radio-frequency identification reader.

13. The apparatus of claim 10, wherein the second portion is coupled to the first portion via the joint such that the radio-frequency identification tag remains parallel to the longitudinal axis of the first portion as the second portion rotates about the second axis.

14. A method comprising:
rotatably coupling a first portion of an adapter to a field device installed at a field location via a threaded portion of the first portion, the adapter is to rotate relative to the field device about a longitudinal axis of the first portion;
rotatably coupling a second portion of the adapter to the first portion via a joint to enable the second portion to rotate about a second axis that extends through the joint and intersects the longitudinal axis of the first portion; and
orientating a radio-frequency identification tag coupled to the second portion of the adapter relative to a radio-frequency identification reader that is to detect the radio-frequency identification tag by at least one of rotating the first portion about the longitudinal axis of the first portion via the threaded portion and rotating the second portion about the second axis via the joint to adjust a direction of a signal of the radio-frequency identification tag.

15. A method of claim 14, wherein rotatably coupling the adapter to the field device includes threadably coupling, via the threaded portion, a first end of the first portion of the adapter to a threaded conduit opening of the field device.

16. The apparatus of claim 15, wherein rotatably coupling the second portion to the first portion includes hingeably coupling the second portion to a second end of the first portion via the joint, the second end opposite the first end of the first portion.

17. A method of claim 14, wherein orientating the radio-frequency identification tag further includes adjusting the second portion to be between parallel and perpendicular relative to the first portion, the second axis being perpendicular to the longitudinal axis of the first portion to enable the second portion to adjust between being parallel and perpendicular to the first portion.

18. A method of claim 14, wherein coupling the second portion to the first portion includes coupling the first portion to the second portion after the first portion is coupled to the field device to prevent the second portion from interfering with coupling the first portion to the field device.

19. A method of claim 14, further comprising adjusting an orientation of the radio-frequency identification tag in response to the field device being moved from the field location to a second field location.

* * * * *

UNITED STATES PATENT AND TRADEMARK OFFICE
CERTIFICATE OF CORRECTION

PATENT NO. : 9,443,186 B2
APPLICATION NO. : 14/299709
DATED : September 13, 2016
INVENTOR(S) : Michel Ken Lovell Page 1 of 1

It is certified that error appears in the above-identified patent and that said Letters Patent is hereby corrected as shown below:

Claims

Column 24, line 30 (Claim 16): Replace "apparatus" with --method--.

Signed and Sealed this
Fifteenth Day of November, 2016

Michelle K. Lee
*Director of the United States Patent and Trademark Office*